3,446,836
**DIMERIZATION OF ACRYLONITRILE TO
1,3-DICYANO-BUTENE-3**
Arthur Lambert and Denis Pemberton, Manchester, England, assignors to Imperial Chemical Industries Limited, London, England, a corporation of Great Britain
No Drawing. Filed Feb. 3, 1967, Ser. No. 613,768
Claims priority, application Great Britain, Feb. 18, 1966, 7,277/66
Int. Cl. B01j 9/00; C07c 121/20, 103/14
U.S. Cl. 260—465.8      7 Claims

ABSTRACT OF THE DISCLOSURE

Functional derivatives of $\alpha,\beta$-unsaturated carboxylic acids, including nitrile, ester and amide derivatives, are converted to their dimers in the presence of catalysts which are tertiary amines having at least one nitrogen atom common to two or three rings, for example triethylene diamine, quinuclidine and pyrrocoline.

---

This invention relates to the dimerisation of derivatives of $\alpha, \beta$-unsaturated carboxylic acids.

It is already known that, for example, acrylonitrile may be dimerised in the presence of a catalyst which is a derivative of trivalent phosphorus to give 1,3-dicyanobutene-3 as the principal product. Such dimerisation is commonly called "heat-to-tail" dimerisation since in the dimer the $\alpha$-carbon atom of one molecule of the monomer is attached to the $\beta$-carbon atom of the other molecule of the monomer. We have now found that such dimerisation may also be effected using certain tertiary amines as catalysts.

Accordingly the invention provides a process for the dimerisation of functional derivatives of $\alpha, \beta$-unsaturated carboxylic acids in the presence of a catalyst which is a cyclic tertiary amine having at least one nitrogen atom common to two or three rings.

The $\alpha,\beta$-unsaturation in the functional derivatives of $\alpha,\beta$-unsaturated carboxylic acids is ethylenic unsaturation.

The functional derivatives of the $\alpha,\beta$-unsaturated carboxylic acids include the nitrile, ester and amide derivatives. Such compounds include acrylonitrile, acrylamide and acrylic esters and also derivatives of such compounds which are capable of dimerisation. As further examples of such compounds there may be mentioned crotonitrile, methacrylonitrile, cinnamonitrile, fumaronitrile, $\alpha$-cyanoprene(1-cyanobutadiene); esters of acrylic, methacrylic, crotonic, cinnamic and fumaric acids, especially the alkyl and aryl esters, for example the lower alkyl esters, such as the methyl, ethyl, propyl and butyl esters, and the phenyl esters; and crotonamide, methacrylamide and cinnamamide. The process is particularly applicable to the dimerisation of acrylonitrile itself to give 1,3-dicyanobutene-3.

The cyclic amine catalysts have at least one nitrogen atom common to two or three rings. In such compounds the electrons on the common nitrogen atom are believed to be sterically more readily available, and this is thought to account for the particular effectiveness of these catalysts. As particular examples of such cyclic tertiary amines there may be mentioned triethylene diamine (diazabicyclo-[2,2,2]-octane), quinuclidine and pyrrocoline. Triethylenediamine is particularly effective.

The amount of cyclic tertiary amine catalyst used in relation to the $\alpha,\beta$-unsaturated compound may vary widely, but amounts between 1% and 25% by weight have been found to be particularly effective. The reaction may be carried out without a solvent, but solvents may be used is desired, for example alcohols, dimethylformamide or benzene. The reaction may be carried out over a wide range of temperatures for example between the ordinary atmospheric temperature and 250° C. However, at relatively low temperatures the reaction is slow and at relatively high temperatures the proportion of polymer relative to dimer increases. For this reason we prefer to carry out the reaction between 50° C. and 220° C.

The reaction may be carried out under pressure if desired or if the temperatue conditions require. It may also be carried out in the presence of an inert gas, for example nitrogen, but in many cases there is no objection to the reaction being carried out in the presence of air. In some cases it may be desirable for the reaction to be carried out in the presence of a polymerisation inhibitor, for example hydroquinone.

The dimer may be obtained from the reaction mixture by various methods. For example, the reaction mixture may be acidified and then extracted with a suitable solvent. Fractional distillation of the extract then allows the solvent and any unchanged monomer to be recovered, and the dimer to be obtained in a purified condition. If desired the cyclic tertiary amine may be recovered from the solvent-extracted, acidified reaction mixture, for example as a salt following concentration by evaporation.

The invention is illustarted but not limited by the following examples in which the parts and percentages are by weight except where otherwise stated and in which the ratio of parts by weight to parts by volume is that of the kilogram to the litre.

EXAMPE 1

A mixture of 30 parts of acrylonitrile and 1 part of triethylenediamine was boiled under reflux for 48 hours. The mixture was acidified with dilute aqueous hydrochloric acid and extracted with chloroform. The chloroform extract was evaporated down to remove chloroform and acrylonitrile and then distilled under reduced pressure. A fraction weighing 5.6 parts, distilling between 129 and 132° C. at 15 mm. mercury pressure, was collected and shown by gas-liquid chromatography, infra-red spectroscopy and nuclear magnetic resonance spectroscopy to be pure, 1,3-dicyanobut-3-ene.

EXAMPLE 2

A miture of 80 parts of acrylonitrile and 8 parts of triethylenediamine was boiled under reflux in an atmosphere of nitrogen for 72 hours. During this time 19 parts of acrylonitrile were lost by evaporation.

The reaction mixture, weight 69 parts, was diluted with 25 parts of water and distilled until a head temperature of 90° C. was reached. The distillate, a mixture of acrylonitrile and water, was dried with potassium carbonate. The weight of acrylonitrile recovered thus was 38 parts.

The distillation residue, which consisted of an aqueous phase and a brown tar was acidified with 13 parts by volume of concentrated aqueous hydrochloric acid and extracted with chloroform. The brown tar which remained with the aqueous layer was filtered off and 9.5 parts of triethylenediamine dihydrochloride were receeovered from the aqueous phase by evaporation under vacuum.

The chloroform extract was then distilled under reduced pressure. There were obtained 13.3 parts of 1,3-dicyanobut-3-ene, boiling between 127 and 130° C. at 18 mm. mercury pressure.

These figures correspond to a yield of dimer on acrylonitrile consumed of 58% and a recovery of triethylenediamine of 71%.

We claim:

1. A process for the manufacture of 1,3-dicyanobutene-3 which comprises catalytically dimerizing acrylonitrile at a temperature between ambient temperature and 250° C. in the presence of from 1–25% by weight, based on the weight of acrylonitrile, of a cyclic tertiary amine as the sole essential catalyst, said amine being selected from the group consisting of triethylene diamine, quinuclidine and pyrrocoline, and separating the 1,3-dicyanobutene-3 thus formed from dimerization medium.

2. The process of claim 1 in which the catalyst is triethylene diamine.

3. The process of claim 1 in which the reaction is carried out at a temperature between 50° C. and 220° C.

4. The process of claim 1 in which the reaction is carried out in the presence of an inert gas.

5. The process of claim 1 in which the reaction is carried out in the presence of air.

6. The process of claim 1 in which the dimer is separated by acidifying the reaction mixture, extracting the dimer with a solvent, and fractionally distilling the extract to recover solvent and any unchanged acrylonitrile and to obtain the dimer in a purified condition.

7. The process of claim 6 in which the solvent-extracted, acidified reaction mixture is concentrated and the cyclic tertiary amine recovered as a salt thereof with the acid.

References Cited

FOREIGN PATENTS 1,032,989   6/1966   Great Britain.

JOSEPH P. BRUST, *Primary Examiner.*

U.S. Cl. X.R.

260—465, 475, 485, 558, 561